United States Patent [19]
Dietrich

[11] Patent Number: 5,435,104
[45] Date of Patent: Jul. 25, 1995

[54] SEAL ASSEMBLY FOR RETRACTABLE DOOR

[75] Inventor: Alfred T. Dietrich, Marion, Ohio

[73] Assignee: Overhead Door Corporation, Dallas, Tex.

[21] Appl. No.: 247,710

[22] Filed: May 23, 1994

[51] Int. Cl.⁶ .............................................. E06B 7/16
[52] U.S. Cl. .................................... 49/493.1; 49/475.1
[58] Field of Search ................. 49/425.1, 482.1, 489.1, 49/493.1, 496.1

[56] References Cited

U.S. PATENT DOCUMENTS

| | | | |
|---|---|---|---|
| 1,081,692 | 12/1913 | Newpher | 49/493.1 |
| 1,094,481 | 4/1914 | Schroyer | 49/493.1 |
| 1,149,072 | 8/1915 | McClellan | 49/493.1 |
| 1,728,120 | 9/1929 | Greene | 49/493.1 |
| 2,511,808 | 6/1950 | Petri . | |
| 2,684,508 | 7/1954 | Meyers et al. . | |
| 2,794,220 | 6/1957 | Libman . | |
| 2,866,237 | 12/1958 | May | 49/493.1 |
| 3,323,256 | 6/1967 | Reahard et al. . | |
| 3,388,502 | 6/1968 | Ceyer et al. . | |
| 3,562,957 | 2/1971 | Landis . | |
| 4,001,974 | 1/1977 | Wright . | |
| 4,015,368 | 4/1977 | Court et al. . | |
| 4,119,325 | 10/1978 | Oakley et al. . | |
| 4,527,807 | 7/1985 | Urbanick . | |
| 5,107,622 | 4/1992 | Fuchs et al. . | |

Primary Examiner—Jerry Redman
Attorney, Agent, or Firm—Kenneth R. Glaser; Dennis T. Griggs

[57] ABSTRACT

A seal assembly for use in combination with a retractable door includes a replaceable seal strip for positively sealing the gap between the door frame and the retractable door. The seal strip is flexed about a fold line in response to compression by transversely sloping seal receiving surfaces of a seal receiver and retainer bar. The external side portion of the seal strip projects transversely with respect to the retractable door, and is deflected by positive engagement with the door when the seal assembly is mounted in the operative position. The retainer bar is secured to the seal receiver by a screw fastener, and may be removed for repair or replacement of the seal strip without requiring removal of the receiver from the door frame. The seal assembly utilizes a replaceable rectangular seal strip of resilient material which initially is in a flat condition. When the seal strip is clamped between the retainer bar and receiver, the external side portion of the seal strip which projects from the seal receiver is automatically flexed to an appropriate angle for positive sealing engagement against the retractable door in the operative position.

13 Claims, 3 Drawing Sheets

SEAL ASSEMBLY FOR RETRACTABLE DOOR

FIELD OF THE INVENTION

This invention relates generally to door seal assemblies, and in particular to a replaceable seal assembly for use in combination with a retractable door.

BACKGROUND OF THE INVENTION

Door panel edge seals are commonly used for sealing enclosure doors of cargo containers, truck vans, truck trailers, railway freight cars and the like. Deflectable seals provide a slidable, positive seal against the exposed side edge surface of movable enclosure doors, particularly the retractable rear doors of over-the-road commercial truck trailers. In such applications, it is important to provide an air-tight and/or weatherproof seal about the interface between the retractable door and the door frame in order to prevent outside air, dust and moisture from penetrating from the exposed side of the door around the door/frame interface through to the protected side of the door.

DESCRIPTION OF THE PRIOR ART

Various gaskets and seals have been employed or proposed for use around the edges of a retractable door to form a slidable, positive seal between the door and the surrounding frame. Such seal assemblies either do not provide an adequate seal or else are difficult to repair or replace. Such seals are constantly exposed to adverse weather conditions, and consequently must be replaced from time-to-time to maintain seal integrity.

A conventional seal which is used in combination with a retractable door installation utilizes a single part seal retainer in which the seal is secured by crimping a retainer flange about the marginal edge of the seal strip. Consequently, replacement of the seal strip necessarily causes damage to the retainer, which must be replaced. That type of seal assembly is difficult to assemble and repair, which sometimes requires special tools, and does not permit removal/replacement of the seal strip without removing the retainer base from the door frame.

Another conventional seal assembly utilizes a seal strip which has a complex, molded cross-section for interlocking engagement within an extruded channel of a seal receiver. Such molded geometry seals and the interlocking receivers are relatively expensive to manufacture, and the receiver may be damaged during removal/replacement of the molded seal strip.

OBJECTS OF THE INVENTION

The general object of the present invention is to provide an improved seal assembly in which the resilient seal element may be quickly and easily replaced without damaging the seal carrier/receiver.

A specific object of the present invention is to provide a seal assembly for use in combination with a retractable door in which it is not necessary to remove the seal carrier from the door frame for repair or replacement of the seal element.

Another object of the present invention is to provide a seal assembly of the character described, in which the seal element is an elongated, flat rectangular strip of resilient material which does not have complex interlocking portions.

Yet another object of the present invention is to provide a seal assembly of the character described, wherein the seal carrier and retainer members have a reduced profile and may be mounted on the door frame of an enclosure with the seal strip being held in slidable, positive sealing engagement with a retractable door substantially without obscuring or blocking the door access opening.

Still another object of the present invention is to provide a door seal assembly of the character described, which does not require special tooling for installation or removal of the seal strip, where the seal strip may be installed or removed with only a screwdriver.

Another object of the present invention is to provide a seal assembly of the character described, which may be installed on conventional door frames without interfering with operation of the door, and which will provide a slidable, positive seal without requiring modification of the door or the door frame.

SUMMARY OF THE INVENTION

The foregoing objects are achieved according to the present invention by a seal assembly which may be installed on the door frame of a conventional retractable door. An elongated, resilient seal strip is clamped between opposing seal receiving surfaces of a seal receiver and a retainer bar. The internal seal receiving surfaces of the seal receiver and retainer bar slope transversely with respect to each other on oppositely facing sides of a seal receiver pocket. As the marginal side portion of the elongated seal is clamped within the receiver pocket between the retainer bar and the seal receiver, the externally projecting side portion of the seal strip is deflected between the transversely sloping surfaces. According to this arrangement, the externally projecting side portion of the seal strip is deflected at an appropriate angle and extended transversely against the exposed surface of the door when the seal assembly is installed on the door frame in the operative position.

According to another feature of the invention, the marginal edge portion of a flat seal strip is clamped securely between the clamp bar and the base member of the seal receiver. This is made possible by securing a marginal side portion of the seal strip within a seal pocket formed between a compression plate and the seal receiving surface of the retainer bar. Compression forces applied against the retainer bar are reacted by an anchor plate and a base plate portion of the seal receiver through a web which connects the anchor plate to the retainer bar. The compression force is applied to the seal strip through an offset wedge portion of the retainer bar. A relief channel permits the offset wedge portion to deflect inwardly relative to the anchor plate and base plate in response to the application of a compression force by a screw fastener.

DETAILED DESCRIPTION OF THE PREFERRED EMBODIMENT

Figure 1:
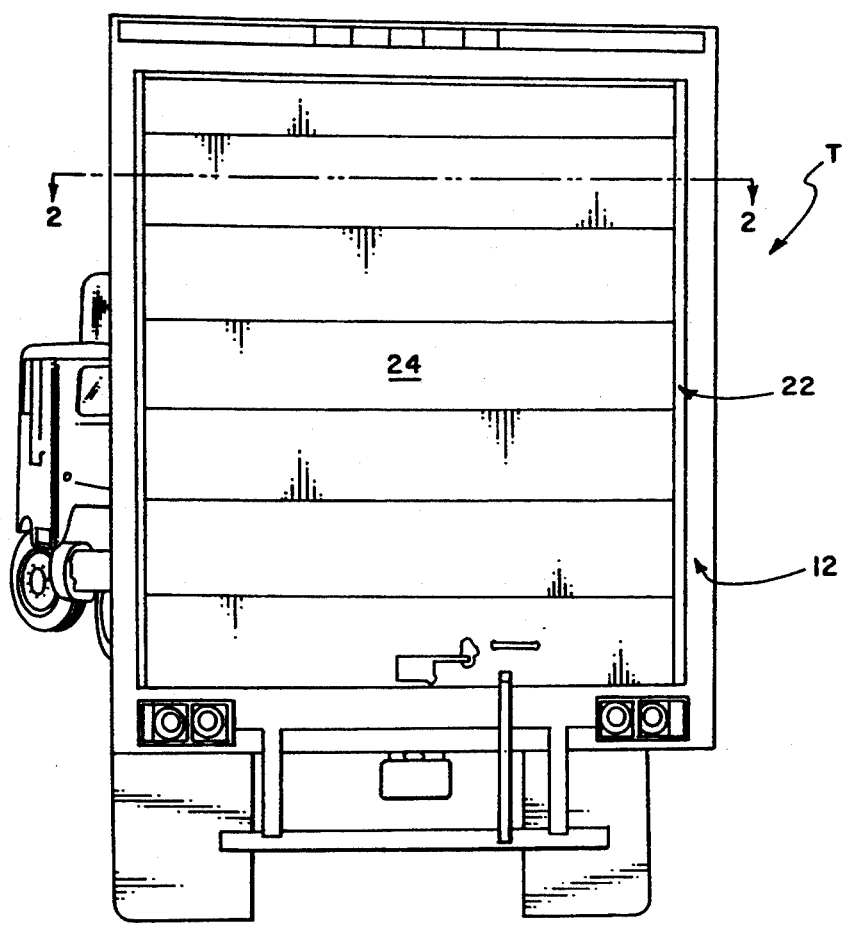
FIG. 1 is a perspective view of an over-the-road commercial truck trailer having a retractable door which is sealed by the seal assembly of the present invention.

In the description which follows, like parts are marked throughout the specification and drawings with the same reference numerals, respectively. The drawing figures are not necessarily drawn to scale and the proportions of certain parts have been exaggerated for purposes of clarity.

Referring now to FIG. 1, FIG. 2, FIG. 3 and FIG. 4 of the drawings, the seal assembly 10 is attached to a rear frame post member 12 of an over-the-road commercial truck trailer T by multiple rivets 14. A guide track 16 is coupled to the channel beam by a support bracket 18. The support bracket 18 is permanently welded to the rear frame post 12, or may be secured by rivets or sheet metal screws. The support bracket 18 positions the guide track in a laterally offset, vertical orientation with respect to the rear frame post 12 (FIG. 6).

Figure 2:
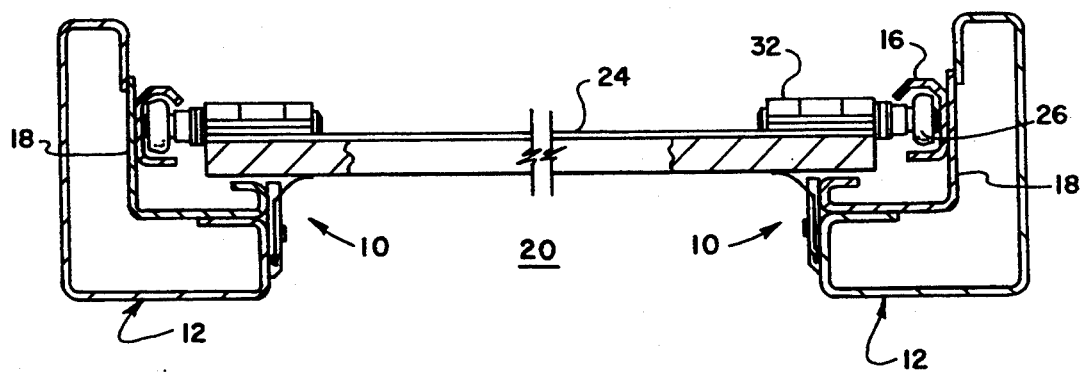
FIG. 2 is a right sectional view of the retractable door installation taken generally from the line 2—2 of FIG. 1.
Figure 6:
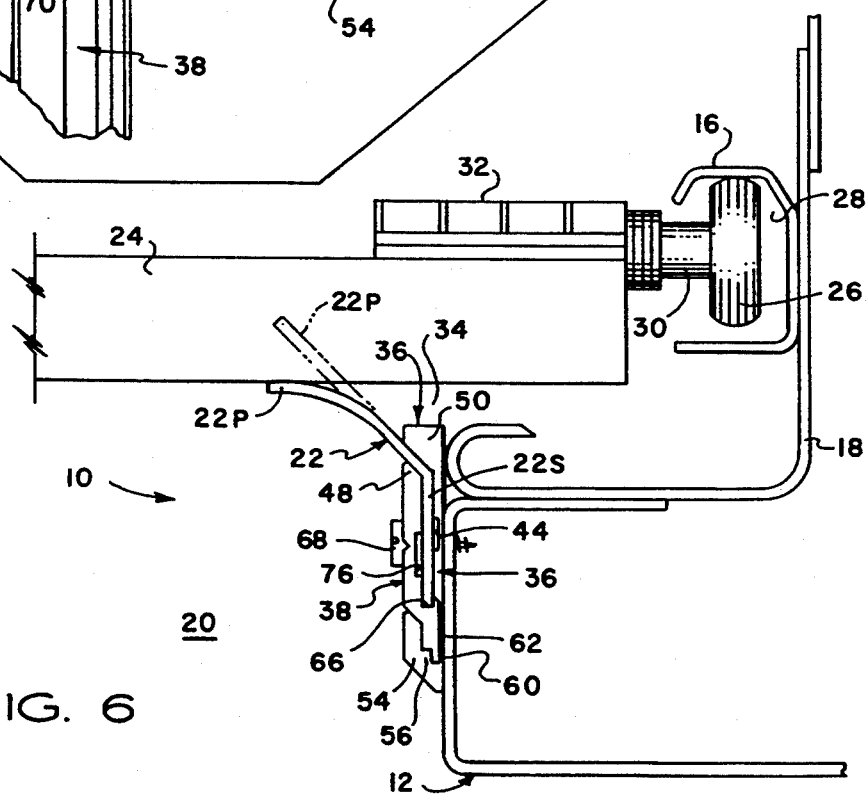

Referring to FIG. 1, FIG. 2 and FIG. 6, the seal assembly 10 is attached to the rear frame post member 12 in an operational position adjacent the access opening 20 of the truck enclosure and holds a seal strip 22 in positive, sealing engagement against a retractable door 24. The retractable door 24 is movably coupled to the guide track 16 by a roller 26 which is confined within a guide channel 28. The roller 26 is mounted on an axial shaft 30 which is journalled for rotation within a sleeve bearing assembly 32. The retractable door 24 is movable from a closed position (FIG. 1) in which the access opening 20 to the trailer enclosure is sealed, to an open position in which the access opening 20 is exposed. The seal strip 22 is resiliently biased into positive engagement with the exposed surface of the retractable door 24, and provides a positive seal which blocks the transmission of air, dust and moisture through the interface gap 34 between the retractable door 24 and the rear frame post 12.

Figure 4:
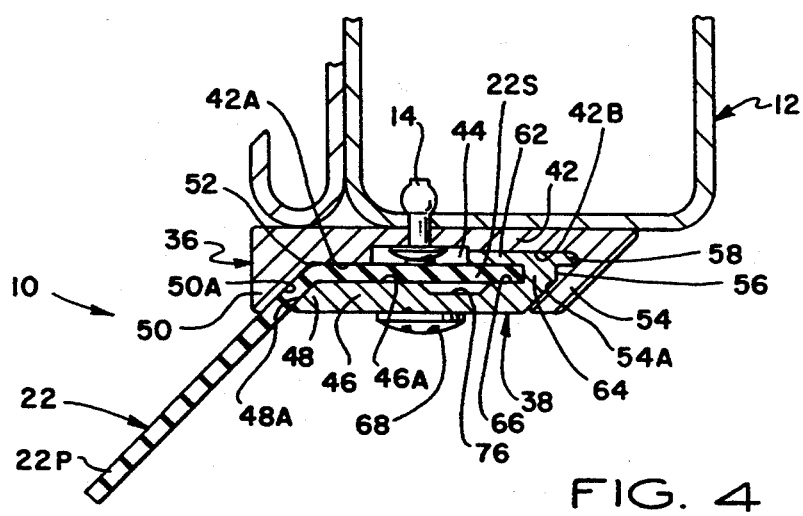
FIG. 4 is a right sectional view taken generally from the line 4—4 of FIG. 3.
Figure 5:
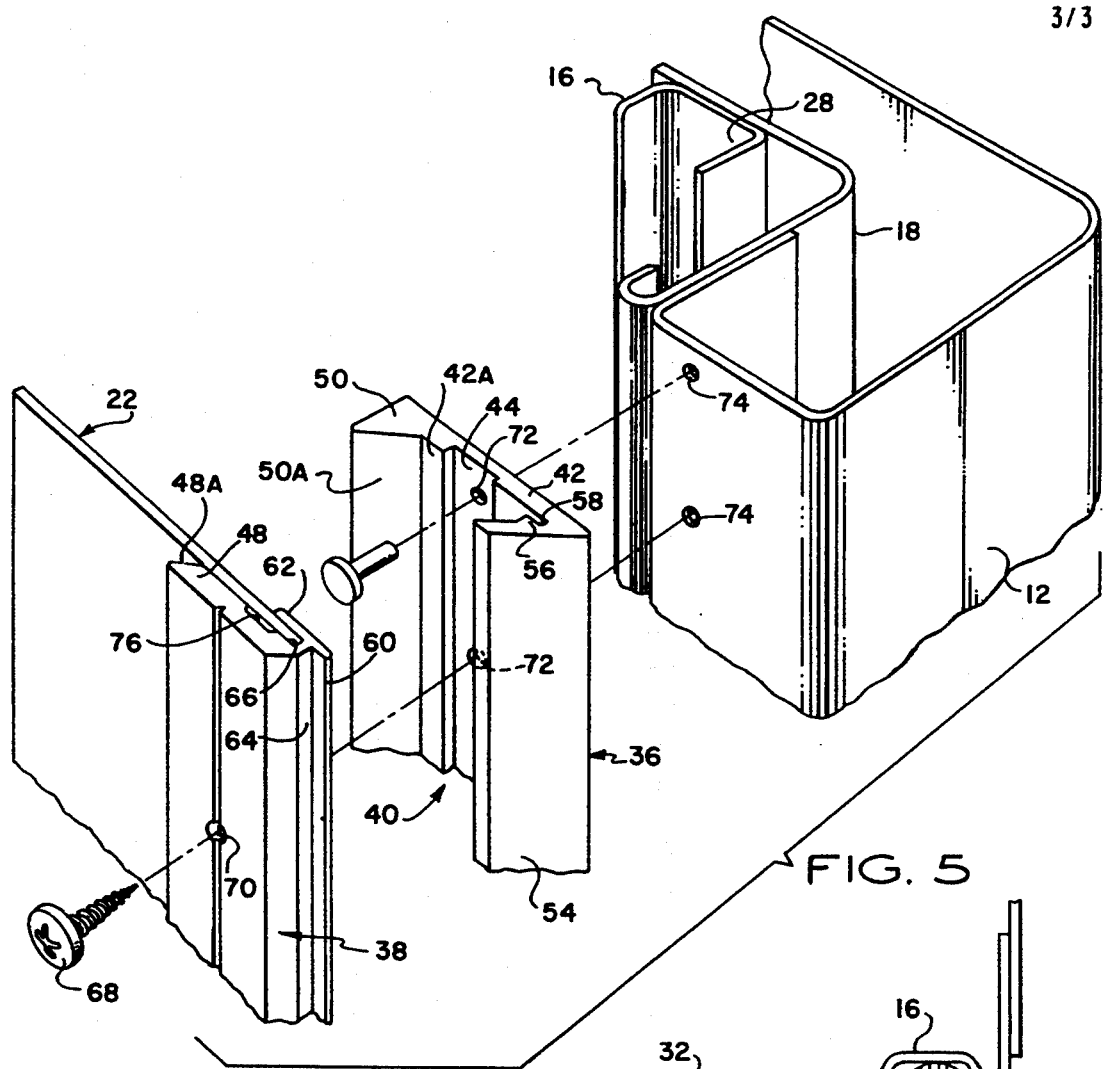
FIG. 5 is a perspective, exploded view of the seal assembly and door frame mounting hardware shown in FIG. 3; and, FIG. 6 is a top plan view of a typical retractable door installation, showing the seal assembly of the present invention installed in an operative position on the door frame, with the seal element being positively engaged against the retractable door.

Referring again to FIG. 3 and FIG. 4, the seal assembly 10 includes as major components the seal strip 22 which is secured by a seal receiver or seal carrier 36 and a seal retainer bar 38. The seal receiver 36 is intersected by an elongated receiver pocket 40 (FIG. 5). The longitudinal receiver pocket 40 receives a marginal side portion 22S of the elongated seal strip 22.

The marginal side portion 22S of the elongated seal strip is engaged by the elongated seal retainer bar 38. The seal receiver has a base member 42 which is adapted for flush attachment to the face of the rear frame post 12. As shown in FIG. 4, the base member 42 is permanently attached to the rear frame post 12 by rivets 14 or sheet metal screws. Preferably, the base member 42 is intersected by a longitudinal channel 44 in which the rivet head is received without interference contact with the seal strip 22.

The retainer bar 38 has a main body member 46 which captures and compresses the seal strip 22S against the main body member 42 of the seal receiver. Referring to FIG. 4, the base member 42 of the seal receiver and the main body member 46 of the retainer bar have complementary seal strip flexing members 48, 50 which are differentially engagable against the seal strip 22 for causing it to flex about a fold line 52. In the preferred embodiment, the flexing member is a wedge 48 which has a sloping face 48A, and the flexing member 50 is a jaw 50 which has a sloping face 50A.

Referring to FIG. 4 and FIG. 5, the face 50A of the jaw 50 slopes transversely with respect to the inside facing surface 42A of the receiver base member 42. Likewise, the face 48A of the wedge 48 slopes transversely with respect to an inside facing surface 46A of the retainer bar 46. The jaw 50 and base member 42 define in combination the flexing member 50, and the wedge 48 and main body portion 46 define the seal strip flexing member 48. In combination, the seal strip flexing members, because of their transversely sloping faces, cause the seal strip 22 to bend about the fold line 52 in response to differential compression of the seal strip between the transversely sloping seal receiving surfaces 48A, 50A and 42A, 46A, respectively.

As a result of differential engagement by the clamping members, the seal strip 22 is securely clamped between the retainer bar 46 and the receiver 36, with its side portions 22S and 22P being partially folded along the fold line 52, whereby the externally projecting side strip portion 22P is properly oriented for positive engagement against the exposed exterior surface of the door 24 (FIG. 6). According to this arrangement, the jaw 50 with its sloping face 50A and the wedge 48 with its sloping face 48A define seal strip flexing members which are differentially engagable against the seal strip 22 relative to the engagement produced by the facing surfaces 42A and 46A of the receiver base member 42 and retainer bar main body portion 46.

The retainer bar 38 is secured in part by a retainer jaw 54 which projects transversely from the receiver base member 42. The retainer jaw 54 has a sloping face 54A which extends transversely with respect to the base member 42, and faces the clamp jaw 50 across the receiver pocket 40. According to one aspect of the invention, the retainer jaw 54 includes a longitudinal rib 56 projecting into the receiver pocket 40, thereby defining an elongated anchor slot 58 between the longitudinal rib and the base member 42.

Referring now to FIG. 4 and FIG. 5, the retainer bar 38 has a projecting lip portion 60 received within the anchor slot 58. The projecting lip portion 60 forms a part of an elongated anchor plate 62 which is coupled to the main body portion 46 of the retainer bar by an elongated web 64. The anchor plate 62 is disposed in surface engagement with a facing surface 42B of the seal receiver base member 42. The anchor plate 62, along with the radially projecting ribs 60, is offset by the web 64 with respect to the retainer bar 38, thereby defining a seal retainer pocket 66 between the retainer bar 38 and the anchor plate 62. The marginal side portion 22S of the seal strip is inserted within the seal retainer pocket 66, while the external seal strip portion 22P projects transversely out of the seal receiver pocket for engagement against the retractable door 24, as shown in FIG. 6.

The base plate 42 of the seal receiver 36 is intersected by the longitudinal channel 44 which accommodates the head of a fastener such as a rivet 14 or sheet metal screw. This permits the seal receiver 36 to be permanently mounted on a door frame member 12 without interfering with the seal strip 22.

The seal retainer bar 38 is insertable in mating, interlocking engagement with the receiver 36, within the seal receiver pocket 40, and may be secured to the base plate of the seal receiver by a sheet metal screw 68.

The anchor lip 60 which forms a part of the anchor plate 62 on the seal retainer bar 38 is engageable within the longitudinal anchor slot 58 formed between the base plate 42 and an offset rib 56 of the seal receiver. The anchor lip 60, when inserted within the longitudinal anchor slot 58, precisely locates the seal retainer bar 38 in lateral alignment within the seal receiver pocket 40, so that pre-drilled holes 70 in the seal retainer bar may be aligned with pre-drilled holes 72 in the seal receiver 36 and pre-tapped holes 74 in the channel frame member 12. The anchor plate 62 is slidable along the face 42B and the anchor lip 60 is slidable through the anchor slot 58 so that the pre-drilled holes may be precisely aligned longitudinally with each other and with the pre-tapped holes 74 in the rear frame post 12, thus permitting quick installation with only a screw driver. Moreover, the mutually engageable, interlocking anchor plate and retainer jaw 54 oppose rotational movement of the retainer jaw relative to the seal receiver, thus preventing deflection of the retainer bar 46 which might tend to release the force of clamping engagement.

Bending compression forces applied to the retainer bar are reacted through the anchor lip 60 and offset rib 56 on one side of the receiver pocket, and are reacted through the seal strip 22 and seal receiver base member 42 on the other side of the receiver pocket.

The retainer bar 38 is secured to the seal receiver 36 by multiple sheet metal screws 68, and may be removed for repair or replacement of the seal strip 22 without requiring removal of the receiver 36 from the rear frame post 12. Clamping force is applied through the flexing portions 48, 50 of the retainer bar and clamp receiver as the main body portion 46 of the clamp bar is deflected toward the receiver base member 42. Referring to FIG. 4, compression forces applied against the retainer bar are reacted by the anchor plate 62 and base plate member 42 of the seal receiver through the longitudinal web 64 which connects the anchor plate to the retainer bar. The compression force is applied to the seal strip wedge portion 48 of the retainer bar.

The anchor plate 62 is prevented from deflecting by the engagement of the anchor lip 60 against the longitudinal rib 56. Consequently, the wedge member 48 deflects in response to a bending force applied through the main body portion 46 of the retainer bar by the screw fastener 68. A relief channel 76 permits the offset wedge portion 48 to deflect inwardly relative to the anchor plate 62 and toward the receiver base plate 42 in response to the application of a compression force by the screw fastener 68.

Figure 3:
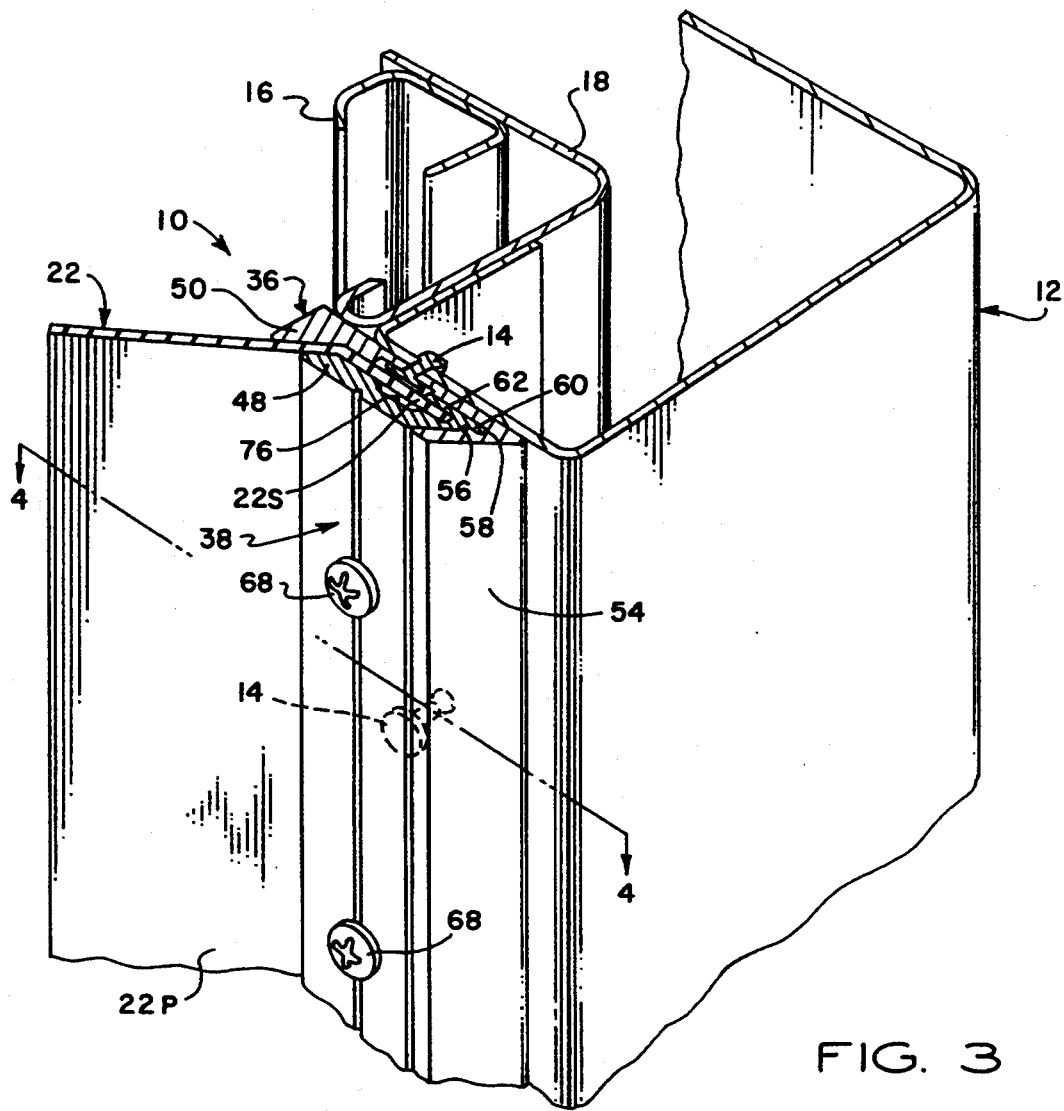
FIG. 3 is a perspective view, partially broken away, of the seal assembly of the present invention shown attached to the rear frame post member of a retractable door installation.

Referring again to FIG. 1 and FIG. 6, the receiver is mounted on the rear frame post 12 in an operative position. In the operative position, the seal strip 22 is clamped between the retainer bar 38 and the receiver 36, and the external side portion 22P of the seal strip which projects from the receiver is automatically flexed to an appropriate angle for positive sealing engagement against the retractable door 24. As shown in FIG. 3, the seal receiver and retainer bar combination may be installed on a conventional door frame post without interfering with operation of the door, and the seal assembly 10 provides a slidable, positive seal without requiring modification of the door or the door frame. The door seal assembly 10 does not require special tooling for installation of the carrier 36, and the retainer bar may be installed and removed with only a screw driver.

Since the fastener 14 for the seal receiver 36 is located in the channel 44 and does not interfere with the retainer bar 38 or the seal strip, the retainer bar and seal strip may be installed and removed without requiring removal of the seal receiver 36. The retainer bar 38 may be removed from the seal receiver 36 simply by removing the screw fastener 68 and withdrawing the anchor plate 62 and anchor rib 60 from the seal receiver pocket 40.

Another advantage of the seal assembly is that it is adapted for use with a replaceable, rectangular seal strip of resilient material which is initially in a flat configuration. A seal strip having a complex, molded cross-section for interlocking engagement with a seal receiver is not required. When the flat seal strip 22 is clamped between the retainer bar and the receiver, the external side portion 22P of the seal strip which projects from the receiver is automatically flexed to an appropriate angle for positive sealing engagement against the retractable door 24. Interlocking engagement of the seal strip with the receiver is not utilized; consequently, upon removal of the retainer bar 38, the seal strip 22 separates easily from the receiver and the retainer bar, and special tooling is not required for installation or replacement.

What is claimed is:

1. A seal assembly for use in combination with a retractable door which is movably coupled to a door frame of an enclosure for movement from a closed position in which an enclosure access opening is sealed by the assembly, to an open position in which the access opening is exposed, the seal assembly comprising, in combination:

a seal receiver having a base member adapted for attachment to said door frame of said enclosure in an operative position and having a longitudinal receiver pocket for receiving a marginal side portion of an elongated seal strip, the base member having first and second seal strip receiving surfaces facing the receiver pocket, the first and second seal strip receiving surfaces sloping transversely with respect to each other and being disposed for clamping engagement with a seal strip;

an elongated seal retainer bar disposed within the receiver pocket, the retainer bar having third and fourth seal strip receiving surfaces facing the receiver pocket, the third and fourth seal strip receiving surfaces sloping transversely with respect to each other and being disposed for clamping engagement with a seal strip; and, a resilient seal strip having a marginal side edge portion disposed within the receiver pocket and clamped between the seal strip receiving surfaces of the seal receiver and the retainer bar, respectively, and having a deflectable seal portion projecting from the seal receiver for engaging the retractable door in the operative position.

2. A seal assembly as defined in claim 1, the seal receiver having a clamp jaw projecting transversely from the base member on one side of the receiver pocket, the clamp jaw having a sloping face which extends transversely with respect to the base member, wherein one of the first and second seal strip receiving surfaces is formed along the sloping face of the clamp jaw, and the other one of the first and second seal strip receiving surfaces being formed along an internal portion of the base member which faces the receiver pocket.

3. A seal assembly as defined in claim 1, the retainer bar having a main body portion and a wedge portion, the wedge portion having a sloping face which extends transversely with respect to the main body portion, wherein one of the third and fourth seal strip receiving surfaces being formed along the sloping face of the wedge portion, and the other one of the third and fourth seal strip receiving surfaces being formed along an internal face portion of the main body portion which faces the receiver pocket.

4. A seal assembly as defined in claim 1, the seal receiver including a retainer jaw projecting transversely with respect to the base member, the retainer jaw having a longitudinal rib projecting into the receiver pocket, thereby defining an elongated anchor slot between the rib and the base member; and, the retainer bar having a projecting lip portion disposed within the anchor slot.

5. A seal assembly as defined in claim 1, the retainer bar comprising:
an elongated main body portion;
an elongated anchor plate disposed in engagement with the base member of the seal receiver;
an elongated web connecting the anchor plate to the main body portion of the retainer bar, the anchor plate being offset with respect to the main body portion, thereby defining a seal retainer pocket between the retainer bar and the anchor plate; and,
the marginal side edge portion of the seal strip being disposed within the seal retainer pocket.

6. A seal assembly as defined in claim 1, the retainer bar comprising:
an elongated main body portion and a wedge portion, the main body portion having a surface which faces the receiver pocket and the wedge portion having a sloping surface which extends transversely with respect to the body portion facing surface, the third and fourth seal strip receiving surfaces being formed along the sloping face of the wedge portion and along the inside surface of the main body portion which faces the receiver pocket.

7. A seal assembly as defined in claim 6, wherein the main body portion of the retainer bar is intersected by a longitudinal relief channel.

8. A seal assembly as defined in claim 1, wherein the base member of the seal receiver is intersected by a longitudinal relief channel, and wherein the depth of the relief channel is sufficient to clear the head of a fastener without permitting interfering contact between the fastener head and the seal strip.

9. A seal assembly comprising, in combination:
a seal receiver having a base member adapted for attachment to a door frame of an enclosure in an operative position and having a longitudinal seal receiver pocket for receiving a marginal side portion of an elongated seal strip and a clamp jaw projecting transversely from the base member on one side of the receiver pocket, the base member being disposed for clamping engagement about one side portion of the elongated seal strip;
an elongated seal retainer bar disposed within the seal receiver pocket, the retainer bar having a main body member disposed for clamping engagement about an opposite side portion of the elongated seal strip;
the base member of the seal receiver and the main body member of the retainer bar having seal receiving surfaces which slope transversely with respect to each other and which are engageable against the seal strip to cause it to bend about a fold line in response to compression of the seal strip between the transversely sloping seal receiving surfaces, the clamp jaw having a sloping face which extends transversely with respect to the base member, and one of the seal receiving surfaces being formed along the sloping face of the clamp jaw; and,
a resilient seal strip having a marginal side edge portion disposed within the seal receiver pocket and clamped between the seal receiving surfaces of the seal receiver and the retainer bar, and having a deflectable seal portion projecting from the seal receiver.

10. A seal assembly comprising, in combination:
a seal receiver having a base member adapted for attachment to a door frame of an enclosure in an operative position and having a longitudinal seal receiver pocket for receiving a marginal side portion of an elongated seal strip, a retainer jaw projecting transversely with respect to the base member, the retainer jaw having a longitudinal rib projecting into the seal receiver pocket, thereby defining an elongated anchor slot between the rib and the base member, the base member being disposed for clamping engagement about one side portion of the elongated seal strip;
an elongated seal retainer bar disposed within the seal receiver pocket, the retainer bar having a main body member disposed for clamping engagement about an opposite side portion of the elongated seal strip and a projecting lip portion disposed within the anchor slot;
the base member of the seal receiver and the main body member of the retainer bar having seal receiving surfaces which slope transversely with respect to each other and which are engageable against the seal strip to cause it to bend about a fold line in response to compression of the seal strip between the transversely sloping seal receiving surfaces; and,
a resilient seal strip having a marginal side edge portion disposed within the seal receiver pocket and clamped between the seal receiving surfaces of the seal receiver and the retainer bar, and having a deflectable seal portion projecting from the seal receiver.

11. A seal assembly comprising, in combination:
a seal receiver having a base member adapted for attachment to a door frame member of an enclosure in an operative position and having a longitudinal seal receiver pocket for receiving an elongated seal strip, the base member being disposed for clamping engagement about one side portion of an elongated seal strip;
an elongated seal retainer bar disposed within the seal receiver pocket, the retainer bar having a main body member disposed for clamping engagement about an opposite side portion of an elongated seal strip;
the base member of the seal receiver and the main body member of the retainer bar having mutually engageable, interlocking members which permit longitudinal sliding movement of the retainer bar relative to the seal receiver, while opposing rotation of the retainer bar relative to the seal receiver, the interlocking members including a retainer jaw projecting transversely from the base member of the seal receiver, the retainer jaw having a longitudinal rib projecting into the seal receiver pocket, thereby defining an elongated anchor slot between the rib and the base member; and, the retainer bar having a projecting lip portion disposed within the anchor slot.

12. A seal assembly comprising, in combination:

a seal receiver having a base member adapted for attachment to a door frame member of an enclosure in an operative position and having a longitudinal receiver pocket for receiving an elongated seal strip, the base member being disposed for clamping engagement about one side portion of an elongated seal strip;

an elongated seal retainer bar including a main body member disposed within the receiver pocket, the retainer bar being disposed for clamping engagement about an opposite side portion of an elongated seal strip; and, the base member of the seal receiver and the main body member of the retainer bar having mutually engageable, interlocking members which permit longitudinal sliding movement of the retainer bar relative to the seal receiver while opposing rotation of the retainer bar relative to the seal receiver, the mutually engageable, interlocking members comprising:

a retainer jaw projecting transversely from the base member of the seal receiver on one side of the receiver pocket, the main body member of the retainer bar being engaged against the retainer jaw;

a clamp jaw projecting transversely from the base member on the opposite side of the receiver pocket, the clamp jaw having a sloping face which extends transversely with respect to the base member;

the seal retainer bar having a wedge portion having a sloping face which extends transversely with respect to the main body member of the retainer bar; and, an elongated seal strip disposed between the sloping surfaces of the clamp jaw and the wedge portion.

13. A seal assembly comprising, in combination:

a seal receiver having a base member adapted for attachment to a door frame of an enclosure in an operative position and having a longitudinal receiver pocket for receiving a marginal side portion of an elongated seal strip, the base member being disposed for clamping engagement about one side portion of the elongated seal strip;

an elongated seal retainer bar disposed within the receiver pocket, the retainer bar having an elongated main body portion disposed for clamping engagement about an opposite side portion of the elongated seal strip, an elongated anchor plate disposed in engagement with the base member of the seal receiver and an elongated web connecting the anchor plate to the main body portion of the retainer bar, the anchor plate being offset with respect to the main body portion, thereby defining a seal retainer pocket between the retainer bar and the anchor plate for retaining a marginal side portion of an elongated seal strip received within the seal retainer pocket;

the base member of the seal receiver and the main body portion of the retainer bar having seal receiving surfaces which slope transversely with respect to each other and which are engageable against the elongated seal strip to cause it to bend about a fold line in response to compression of the seal strip between the transversely sloping seal receiving surfaces; and, a resilient elongated seal strip having one marginal side edge received within the seal retainer pocket and an opposed marginal side edge portion disposed within the receiver pocket and clamped between the seal receiving surfaces of the seal receiver and the retainer bar, and having a deflectable seal portion projecting from the seal receiver.

* * * * *